(12) United States Patent
Pavlou

(10) Patent No.: US 11,457,483 B2
(45) Date of Patent: Sep. 27, 2022

(54) MANAGING CONNECTIONS BETWEEN A USER DEVICE AND PERIPHERAL DEVICES

(71) Applicant: Citrix Systems, Inc., Fort Lauderdal, FL (US)

(72) Inventor: Chris Pavlou, Boca Raton, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 243 days.

(21) Appl. No.: 16/834,124

(22) Filed: Mar. 30, 2020

(65) Prior Publication Data
US 2021/0307085 A1 Sep. 30, 2021

(51) Int. Cl.
*H04W 76/00* (2018.01)
*H04W 52/02* (2009.01)
*G06F 1/3234* (2019.01)

(52) U.S. Cl.
CPC ............ *H04W 76/00* (2013.01); *G06F 1/325* (2013.01); *H04W 52/0254* (2013.01)

(58) Field of Classification Search
CPC .... H04W 76/00; H04W 52/0254; G06F 1/325
See application file for complete search history.

(56) References Cited

U.S. PATENT DOCUMENTS

| | | | | |
|---|---|---|---|---|
| 5,781,744 A | * | 7/1998 | Johnson | G06F 13/4081 710/15 |
| 6,029,155 A | * | 2/2000 | Bass | G06F 13/124 705/401 |
| 6,049,840 A | * | 4/2000 | Shibuya | G06F 9/4406 710/5 |

(Continued)

FOREIGN PATENT DOCUMENTS

| | | |
|---|---|---|
| CN | 102778966 | 11/2012 |
| CN | 132713 | 12/2013 |

(Continued)

OTHER PUBLICATIONS

Gaunting et al., "Method for Operating Simulation Touch Screen by Mouse", a machine English translation version of Chinese Patent Application CN 103472931A, published Dec. 25, 2013, pp. 1-24.
"Windows Touch Gestures Overview.pdf", extracted from website, https://web.archive.org/web/20151121192051/https://msdn.microsoft.com/en-us/library/windows/desktop/dd940543(v=vs.85).aspx, published Nov. 21, 2015, pp. 1-5.

(Continued)

*Primary Examiner* — Dominic E Rego
(74) *Attorney, Agent, or Firm* — BainwoodHuang

(57) ABSTRACT

Techniques manage connection between a user device (e.g., a tablet, a smartphone, a personal computer, a user workstation, etc.) and a peripheral device (e.g., an external mouse, a wireless keyboard, a wireless output device, other accessories, combinations thereof, etc.). Such techniques involve obtaining a current peripheral identifier from an operating system running on the user device, the current peripheral identifier identifying the peripheral device. Such techniques further involve, based on the current peripheral identifier, performing a peripheral recognition operation that attempts to recognize the peripheral device. Such techniques further involve, based on a result of the peripheral recognition operation, performing a peripheral access operation that determines whether the user device is allowed to connect with the peripheral device.

20 Claims, 6 Drawing Sheets

(56) References Cited

U.S. PATENT DOCUMENTS

| | | | |
|---|---|---|---|
| 6,336,151 B1* | 1/2002 | Seki | G06F 9/4411 709/217 |
| 6,684,337 B1* | 1/2004 | Kuo | G06F 1/266 455/573 |
| 6,789,111 B1* | 9/2004 | Brockway | G06F 9/4411 709/203 |
| 6,931,442 B1* | 8/2005 | Hamanaka | H04L 41/22 709/202 |
| 7,287,100 B2* | 10/2007 | Chien | G06F 1/1632 710/1 |
| 7,330,919 B2 | 2/2008 | Zhang et al. | |
| 8,898,722 B2 | 11/2014 | Reisman | |
| 9,110,581 B2 | 8/2015 | Momchilov | |
| 9,152,436 B2 | 10/2015 | Momchilov | |
| 9,514,507 B2 | 12/2016 | McKenzie et al. | |
| 9,588,637 B2 | 3/2017 | Momchilov et al. | |
| 9,729,520 B2 | 8/2017 | Barton et al. | |
| 9,736,221 B2 | 8/2017 | Momchilov et al. | |
| 9,760,724 B2 | 9/2017 | Frost | |
| 9,836,437 B2 | 12/2017 | Wiitala et al. | |
| 10,116,505 B2* | 10/2018 | Kim | H04L 63/0884 |
| 10,122,709 B2 | 11/2018 | Momchilov et al. | |
| 10,394,346 B2 | 8/2019 | Pavlou et al. | |
| 10,466,811 B2 | 11/2019 | Pavlou et al. | |
| 10,609,227 B2* | 3/2020 | Oh | G06F 16/51 |
| 10,673,845 B2 | 6/2020 | Momchilov et al. | |
| 10,896,266 B1* | 1/2021 | BeSerra | G06F 21/57 |
| 2002/0135584 A1* | 9/2002 | Lee | G09G 5/006 345/531 |
| 2002/0156947 A1* | 10/2002 | Nishio | G06F 9/4411 710/36 |
| 2003/0093768 A1* | 5/2003 | Suzuki | G06F 3/1225 717/100 |
| 2004/0001044 A1 | 1/2004 | Luciani, Jr. et al. | |
| 2004/0004603 A1 | 1/2004 | Gerstner et al. | |
| 2004/0098604 A1* | 5/2004 | Noldge | G06F 21/73 713/193 |
| 2004/0260845 A1* | 12/2004 | Inokuchi | G06F 9/4411 710/8 |
| 2005/0078645 A1* | 4/2005 | Hamadi | H04W 88/06 370/338 |
| 2005/0162688 A1* | 7/2005 | Nakaoka | G06F 3/1288 358/1.15 |
| 2005/0166241 A1* | 7/2005 | Kim | H04N 21/43637 725/81 |
| 2008/0120448 A1 | 5/2008 | Shi et al. | |
| 2008/0143520 A1* | 6/2008 | Kim | G06K 17/00 340/540 |
| 2008/0174570 A1 | 7/2008 | Jobs et al. | |
| 2008/0222326 A1 | 9/2008 | Liu et al. | |
| 2009/0057286 A1* | 3/2009 | Ihara | B23K 9/1062 219/130.21 |
| 2009/0125640 A1* | 5/2009 | Sunwoo | G06F 3/0346 710/3 |
| 2010/0052854 A1* | 3/2010 | Jeun | G06F 21/35 340/5.85 |
| 2010/0268828 A1 | 10/2010 | Pahlavan et al. | |
| 2011/0109552 A1 | 5/2011 | Yasutake | |
| 2012/0075667 A1* | 3/2012 | Kamata | H04L 67/1097 358/1.15 |
| 2012/0119888 A1* | 5/2012 | Reeves | G05B 19/0426 340/12.24 |
| 2012/0239240 A1* | 9/2012 | Nakano | G05D 1/0274 701/25 |
| 2013/0166629 A1 | 6/2013 | Ivashin et al. | |
| 2013/0262560 A1 | 10/2013 | Ivashin et al. | |
| 2013/0297830 A1* | 11/2013 | Pao | G06F 13/102 710/3 |
| 2014/0002361 A1 | 1/2014 | Ballard et al. | |
| 2014/0075062 A1 | 3/2014 | Yasuno et al. | |
| 2014/0196142 A1 | 7/2014 | Louboutin et al. | |
| 2014/0319232 A1 | 10/2014 | Gourlay et al. | |
| 2014/0325096 A1* | 10/2014 | Jung | G06F 13/126 710/16 |
| 2015/0077352 A1 | 3/2015 | Ma | |
| 2015/0212698 A1 | 7/2015 | East et al. | |
| 2016/0224959 A1* | 8/2016 | Oishi | H04W 4/023 |
| 2016/0381201 A1* | 12/2016 | Park | H04M 1/72415 455/557 |
| 2017/0243023 A1* | 8/2017 | Lee | G06F 21/629 |
| 2017/0338685 A1* | 11/2017 | Jung | H02J 7/0021 |
| 2018/0160463 A1* | 6/2018 | Huttunen | G06F 13/00 |
| 2018/0173665 A1* | 6/2018 | Mishra | G06F 13/4282 |
| 2018/0253532 A1* | 9/2018 | Granneman | A61B 1/00006 |
| 2019/0228168 A1* | 7/2019 | Kamini | H04L 63/108 |
| 2020/0220621 A1* | 7/2020 | Lee | H04N 21/4108 |
| 2020/0220783 A1* | 7/2020 | Michaud | H04L 41/5058 |

FOREIGN PATENT DOCUMENTS

| | | |
|---|---|---|
| EP | 31739036 | 5/2017 |
| KR | 1020110007114 | 1/2011 |

OTHER PUBLICATIONS

"Making the Mouse Left-Handed in Windows 7.pdf", extracted from website, https://web.archive.org/web/20130304035512/http://www.bbc.co.uk/accessibility/guides/mouse_easier/left_handed/win/win7/index.shtml#extversion, published Mar. 4, 2013, pp. 1-3.

CN103472931A Diagrams Espacenet.pdf machine English translation version of Chinese Patent Application "CN 103472931 A" from Espacenet, published Dec. 25, 2013, Inventor: Chen, Guanting et al.

* cited by examiner

MANAGING CONNECTIONS BETWEEN A USER DEVICE AND PERIPHERAL DEVICES

BACKGROUND

A conventional user computer may connect with one or more wireless accessories. Example wireless accessories include a wireless computer mouse, a wireless keyboard, a wireless set of earbuds, and a wireless printer, among others.

Once the user computer connects with a wireless accessory, the user computer is able to receive input from and/or provide output to the wireless accessory. For example, a remote desktop client running on a user computer may receive user input from a wireless computer mouse. The remote desktop client may then use that user input to control a remote desktop session hosted on a remote desktop server (e.g., to edit a document, to access email, to navigate a browser, etc.).

SUMMARY

Unfortunately, there are deficiencies to the above-mentioned conventional user computer. Along these lines, it may be easy for the conventional user computer to connect with the wrong wireless accessory such as someone else's wireless computer mouse. Moreover, once the conventional user computer connects with the wrong wireless accessory, the user must spend time and effort to disconnect the user computer from the wrong wireless accessory before re-attempting to connect with the correct wireless accessory.

For example, suppose that the user computer is mobile (e.g., a tablet, a smartphone, a laptop, etc.) and that a user launches a remote desktop client on the user computer while in a public area such as a common office space, a library, a café, etc. Here, the user may wish to operate a remote desktop session using a wireless computer mouse.

For the remote desktop client to use the wireless computer mouse, the remote desktop client initiates a discovery process by directing the operating system running on the user computer to start scanning for a wireless computer mouse. When the operating system receives an availability signal from a wireless computer mouse, the operating system informs the remote desktop client that it has discovered a wireless computer mouse. Unfortunately, at this time, the operating system does not provide further information that would enable the remote desktop client to determine whether the operating system has previously paired with wireless computer mouse.

Upon such discovery, the remote desktop client (perhaps after prompting the user for permission) directs the operating system to connect with the wireless computer mouse. In response to such direction, the operating system compares certain identifying data that the operating system received from the wireless computer mouse to the operating system's paired devices list. If this identifying data is on the operating system's paired devices list, the operating system automatically connects with the wireless computer mouse. However, if this identifying data is not on the operating system's paired devices list, the operating system may require the user to perform an additional pairing step which adds the identifying data to the operating system's paired devices list (to enable automatic connecting in the future) while connecting with the wireless computer mouse.

In the above-described conventional scenario, it is easy for the user to inadvertently direct the user computer to connect with the wrong wireless computer mouse, e.g., a wireless computer mouse belonging to someone else in the vicinity. Unfortunately, the user will not realize that the user computer has connected with the wrong mouse until after the operating system connects and pairs with the wrong mouse and adds identifying data regarding the wrong mouse to the operating system's paired devices list. At this point, the user must disconnect the operating system from the wrong mouse and remove (i.e., forget) the identifying data from the operating system's paired devices list before restarting the discovery process in hope of connecting with the correct mouse.

In contrast to the above-described conventional scenario for connecting a user computer with a wireless computer mouse, improved techniques are directed to managing a connection between a user device and a peripheral device based on a peripheral identifier. To this end, the user device manages one or more peripheral device lists and connection modes that enable a user to easily customize and control the connection behavior of the user device. Along these lines, a list of known peripheral device identifiers enables the user device to connect only with known peripheral devices if desired by the user (i.e., listed peripheral devices that have previously connected with the user device) thereby eliminating the possibility of inadvertently connecting with a new peripheral device that belongs to someone else. Additionally, such a known peripheral list enables the user device to connect only with new peripheral devices if desired by the user (i.e., unlisted peripheral devices that have not previously connected with the user device) thereby enabling the user device to purposefully connect with a previously unknown peripheral device (i.e. a peripheral device that is not currently known to the device). Furthermore, such customization enables the user device to maintain a list of disregarded peripheral devices (e.g., peripheral devices that should always be ignored by the user device).

One embodiment is directed to a method of managing a connection between a user device and a peripheral device. The method includes obtaining a current peripheral identifier from an operating system running on the user device, the current peripheral identifier identifying the peripheral device. The method further includes, based on the current peripheral identifier, performing a peripheral recognition operation that attempts to recognize the peripheral device. The method further includes, based on a result of the peripheral recognition operation, performing a peripheral access operation that determines whether the user device is allowed to connect with the peripheral device.

In some arrangements, obtaining the current peripheral identifier from the operating system includes calling a discovery routine of the operating system via an application programming interface (API) of the operating system, and receiving a discovery result via the API of the operating system in response to calling the discovery routine. The discovery result indicates discovery of the peripheral device and including the current peripheral identifier.

In some arrangements, the peripheral device is a pointer apparatus configured to operate a remote desktop session provided by a virtual desktop client running on the user device. Additionally, the discovery result further includes a current custom service identifier that is different from the current peripheral identifier. Furthermore, calling the discovery routine includes invoking the discovery routine from the virtual desktop client running on the user device. Also, receiving the discovery result includes comparing, by the virtual desktop client, the current custom service identifier with an expected custom service identifier to verify that the peripheral device is the pointer apparatus configured to operate the remote desktop session provided by the virtual desktop client running on the user device.

In some arrangements, calling the discovery routine includes invoking, as the discovery routine, a Bluetooth peripheral scanning service of the operating system, the Bluetooth peripheral scanning service being configured to scan for Bluetooth available peripheral devices. Additionally, receiving the discovery result includes acquiring a discovery notification message from the Bluetooth peripheral scanning service, the discovery notification message (i) indicating discovery of a Bluetooth peripheral device as the peripheral device and (ii) containing a Bluetooth peripheral device instance that includes the current peripheral identifier.

In some arrangements, the user device stores a list of known peripheral identifiers identifying known peripheral devices. Additionally, performing the peripheral recognition operation includes performing a set of comparison operations to determine whether the current peripheral identifier is on the list of known peripheral identifiers.

In some arrangements, the method further includes, prior to performing the peripheral recognition operation, ascertaining a current recognition mode for the user device. The current recognition mode indicates whether the user device is currently configured to connect with known peripheral devices.

In some arrangements, the result of the peripheral recognition operation indicates that the set of comparison operations determined that the current peripheral identifier is on the list of known peripheral identifiers. Additionally, the current recognition mode indicates that the user device is currently configured to connect with known peripheral devices. Furthermore, performing the peripheral access operation includes allowing the user device to connect with the peripheral device.

In some arrangements, the result of the peripheral recognition operation indicates that the set of comparison operations determined that the current peripheral identifier is on the list of known peripheral identifiers. Additionally, the current recognition mode indicates that the user device is currently configured to not connect with known peripheral devices. Furthermore, performing the peripheral access operation includes preventing the user device from connecting with the peripheral device.

In some arrangements, the result of the peripheral recognition operation indicates that the set of comparison operations determined that the current peripheral identifier is not on the list of known peripheral identifiers. Additionally, the current recognition mode indicates that the user device is currently configured to connect with unknown peripheral devices. Furthermore, performing the peripheral access operation includes allowing the user device to connect with the peripheral device.

In some arrangements, the result of the peripheral recognition operation indicates that the set of comparison operations determined that the current peripheral identifier is not on the list of known peripheral identifiers. Additionally, the current recognition mode indicates that the user device is currently configured to not connect with unknown peripheral devices. Furthermore, performing the peripheral access operation includes preventing the user device from connecting with the peripheral device.

In some arrangements, the user device stores a list of disregarded peripheral identifiers identifying disregarded peripheral devices. Additionally, performing the peripheral recognition operation includes performing a set of matching operations to determine whether the current peripheral identifier is on the list of disregarded peripheral identifiers.

In some arrangements, the result of the peripheral recognition operation indicates that the set of matching operations determined that the current peripheral identifier is on the list of disregarded peripheral identifiers. Additionally, performing the peripheral access operation includes preventing the user device from connecting with the peripheral device.

In some arrangements, the result of the peripheral recognition operation indicates that the set of matching operations determined that the current peripheral identifier is not on the list of disregarded peripheral identifiers. Additionally, performing the peripheral access operation includes allowing the user device to connect with the peripheral device.

In some arrangements, the method further includes, after the user device is allowed to connect with the peripheral device, providing a connection prompt that asks a user whether the user device should connect with the peripheral device.

In some arrangements, the method further includes, after providing the connection prompt, receiving a connection instruction from the user, the connection instruction instructing the user device to connect with the peripheral device, and in response to the connection instruction instructing the user device to connect with the peripheral device, connecting the user device with the peripheral device and adding the current peripheral identifier to the list of known peripheral identifiers.

In some arrangements, the method further includes, after providing the connection prompt, receiving a connection instruction from the user, the connection instruction instructing the user device to not connect with the peripheral device, and in response to the connection instruction instructing the user device to not connect with the peripheral device, preventing the user device from connecting with the peripheral device and adding the current peripheral identifier to the list of disregarded peripheral identifiers.

In some arrangements, performing the peripheral access operation results in the user device being prevented from connecting with the peripheral device. Additionally, the method further includes, after the user device is prevented from connecting with the peripheral device, obtaining a second peripheral identifier from the operating system, the second peripheral identifier identifying a second peripheral device for recognition and possible connection with the user device.

In some arrangements, the user device stores a list of disregarded peripheral identifiers identifying disregarded peripheral devices. Additionally, the list of disregarded peripheral identifiers includes the current peripheral identifier to prevent the user device from connecting with the peripheral device. Furthermore, the method further includes receiving an edit instruction that instructs the user device to remove the current peripheral identifier from the list of disregarded peripheral identifiers, and in response to the edit instruction, removing the current peripheral identifier from the list of disregarded peripheral identifiers.

Another embodiment is directed to a computer program product having a non-transitory computer readable medium that stores a set of instructions to manage connection between a user device and a peripheral device. The set of instructions, when carried out by circuitry of the user device, causing the circuitry of the user device to perform a method of:

(A) obtaining a current peripheral identifier from an operating system running on the user device, the current peripheral identifier identifying the peripheral device;

(B) based on the current peripheral identifier, performing a peripheral recognition operation that attempts to recognize the peripheral device; and (C) based on a result of the peripheral recognition operation, performing a peripheral access operation that determines whether the user device is allowed to connect with the peripheral device.

Yet another embodiment is directed to a user device which includes a wireless communications interface, memory, and control circuitry coupled to the wireless communications interface and the memory. The memory storing instructions that, when carried out by the control circuitry, cause the control circuitry to:

(A) obtain a current peripheral identifier from an operating system running on the user device, the current peripheral identifier identifying a peripheral device, (B) based on the current peripheral identifier, perform a peripheral recognition operation that attempts to recognize the peripheral device, and (C) based on a result of the peripheral recognition operation, perform a peripheral access operation that determines whether the user device is allowed to connect with the peripheral device through the wireless communications interface.

Other embodiments are directed to electronic systems and apparatus, processing circuits, computer program products, and so on. Some embodiments are directed to various methods, electronic components and circuitry that are involved in managing connection between a user device and a peripheral device.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique involves managing a connection between a user device (e.g., a tablet, a smartphone, a personal computer, a user workstation, etc.) and a peripheral device (e.g., an external mouse, a wireless keyboard, a wireless output device, other accessories, combinations thereof, etc.). To this end, the user device manages one or more peripheral device lists and connection modes that enable a user to easily customize and control the connection behavior of the user device. Along these lines, a list of known peripheral device identifiers enables the user device to connect only with known peripheral devices if desired by the user (i.e., listed peripheral devices) thereby eliminating the possibility of inadvertently connecting with a new peripheral device that belongs to someone else. Additionally, such a known peripheral list enables the user device to connect only with new peripheral devices if desired by the user (i.e., unlisted peripheral devices) thereby enabling the user device to purposefully connect with a previously unknown peripheral device. Furthermore, such customization enables the user device to maintain a list of disregarded peripheral devices (e.g., peripheral devices that the user device should ignore/disregard) to prevent the user device from inadvertently connecting with an unwanted peripheral device.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
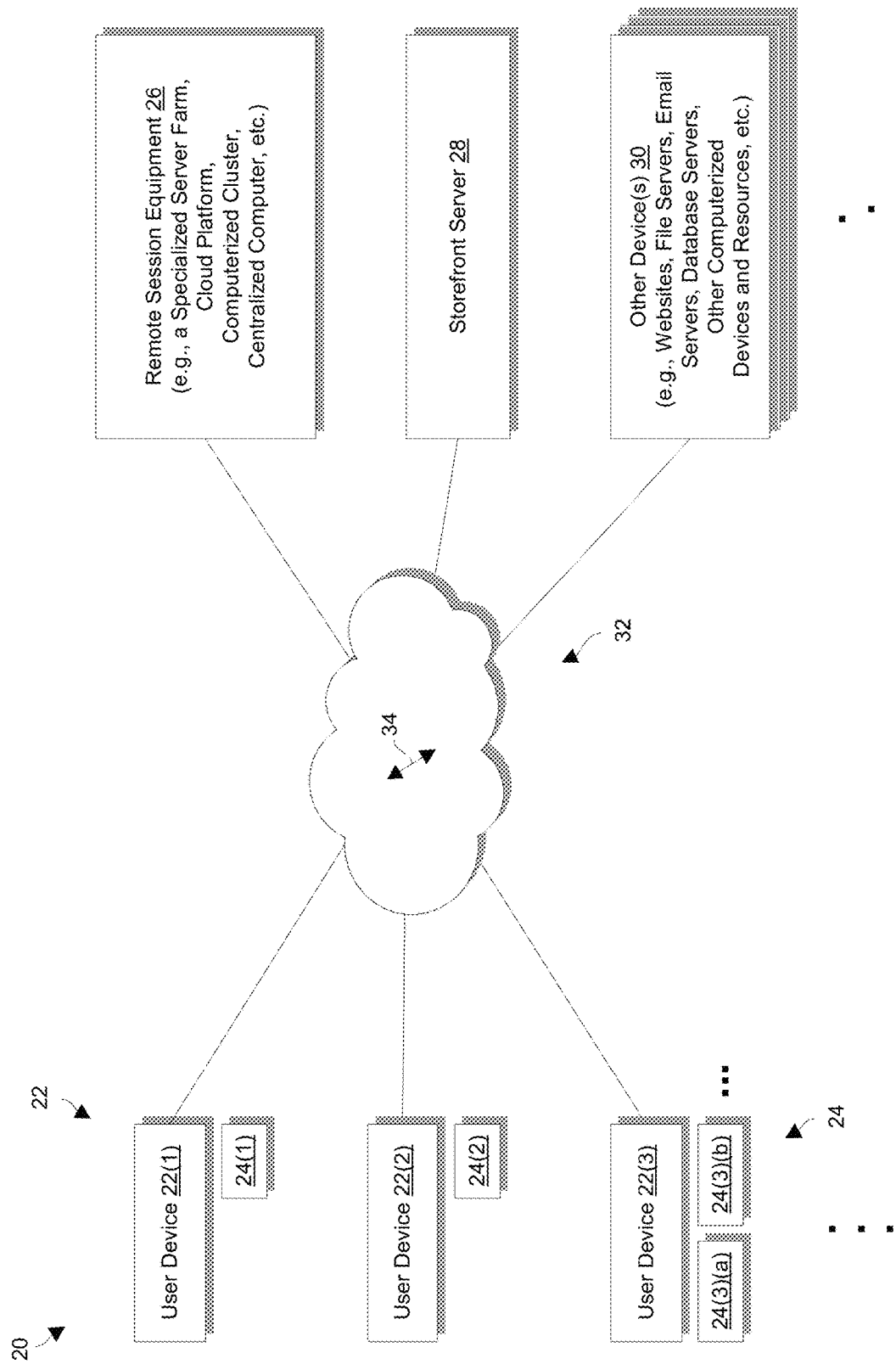
FIG. 1 is a block diagram of a computing environment having at least one user device capable of managing connection with a set of peripheral devices in accordance with certain embodiments.

FIG. 1 shows a computing environment 20 having at least one user device capable of managing connection with a set of peripheral devices in accordance with certain embodiments. The computing environment 20 includes user devices 22(1), 22(2), 22(3), . . . (collectively, user devices 22), wireless peripheral devices 24(1), 24(2), 24(3)(a), 24(3)(b), . . . (collectively, wireless peripheral devices 24), remote session equipment 26, a storefront server 28, other devices 30, and a communications medium 32. For illustration purposes and as will be explained in further detail below, the computing environment 20 may provide a virtual desktop infrastructure (VDI) where one or more of the user devices 22 operates as a virtual desktop client that enables a user to control a remote desktop session hosted by the remote session equipment 26.

The user devices 22 are equipped with wireless communications interfaces (e.g., wireless transceivers) and are constructed and arranged to perform useful work. Via the wireless communications interfaces, the user devices 22 may connect with the wireless peripheral devices 24 to exchange information. Examples of suitable user devices 22 include smartphones, tablets, laptops, desktop computers, workstations, application specific or dedicated computerized equipment, combinations thereof, and so on.

The wireless peripheral devices 24 are constructed and arranged to provide input and/or render output. Accordingly, the wireless peripheral devices 24 enable users to use/operate various applications running on the user devices 22 while performing useful work. Examples of suitable peripheral devices include wireless mice, wireless keyboards, wireless speakers, wireless earbuds/headphones, wireless webcams/microphones, wireless displays, wireless printers, other input/output (I/O) devices, combinations thereof, and so on.

As shown in FIG. 1, the user device 22(1) connects with wireless peripheral device 24(1). Similarly, the user device 22(2) connects with wireless peripheral device 24(2), and so on.

Moreover, it should be understood that a user device 22 may connect with multiple wireless peripheral devices 24 as illustrated by the user device 22(3) which connects with wireless peripheral devices 24(3)(a), 24(3)(b), etc. Communications between a user device 22 and a wireless peripheral device 24 may be either full duplex or half duplex. In some arrangements, the communications between a user device 22 and a wireless peripheral device 24 utilizes Bluetooth and/or other RF technologies.

The remote session equipment 26 is constructed and arranged to provide access to remote desktop session resources such as a remote desktop or workspace, a remotely hosted application, a remote virtual machine, a remote session platform, and so on. For example, a user may run a virtual desktop client (or similar workspace-style application) on a user device 22 to access a remote desktop provided by the remote session equipment 26. In such a situation, the remote desktop may include a variety of remote desktop applications such as a document editor, an email client, a calendar tool, a web browser, and so on.

The storefront server 28 is constructed and arranged to provide an interface (e.g., a storefront website) for users to access a variety of applications (e.g., virtual desktop client software, software to access other hosted virtualization services, other enterprise applications, and so on). Accordingly, the user devices 22 may download, install, enroll, subscribe, and/or otherwise obtain access to a variety of resources through the storefront server 28.

The other devices 30 represent other equipment/apparatus that reside within the computing environment 20 (e.g., email servers, file servers, database servers, websites, other equipment that provides services and/or content for remote desktops, etc.). Such other equipment may be distributed among different locations, located within datacenters, may be cloud-based, combinations thereof, and so on.

The communications medium 32 is constructed and arranged to connect the various components of the computing environment 20 together to enable these components to exchange electronic signals 34 (e.g., see the double arrow 34). At least a portion of the communications medium 32 is illustrated as a cloud to indicate that the communications medium 32 is capable of having a variety of different topologies including backbone, hub and spoke, loop, irregular, combinations thereof, and so on.

Along these lines, the communications medium 32 may include copper based data communications devices and cabling, fiber optic devices and cabling, wireless devices, combinations thereof, etc. Furthermore, the communications medium 32 is capable of supporting a variety of communications types such as Ethernet-based communications, cellular communications, plain old telephone service (POTS) communications, combinations thereof, and so on.

In some situations, at least a portion of the computing environment 20 utilizes a virtualization platform that runs virtual machines (VMs) for scalability, load balancing, fault tolerance, and so on. In some arrangements, one or more components of the computing environment 20 (e.g., the remote session equipment 26, the storefront server 28, etc.) are co-located in a datacenter (e.g., hosted on one or more data center servers) which utilizes the virtualization platform.

For illustration purposes only, the wireless peripheral devices 24 may be described at times in the context of wireless mouse devices that provide mouse input. Along these lines, virtual desktop client applications running on the user devices 22 may form specialized circuitry that connects with the wireless mouse devices to enable users of the user devices 22 to operate remote desktop sessions using such mouse input. However, such a context is by way of example only and it should be understood that other types of peripheral devices 24 are suitable for use as well.

During operation of the computing environment 20, users operate the user devices 22 to perform useful work. While doing so, the user devices 22 may connect with the wireless peripheral devices 24 to make use of the wireless peripheral devices 24. To this end, special circuits formed by applications running on the user devices 22 are able to manage connections between the user devices 22 and the wireless peripheral devices 24 to improve the user experience.

Along these lines, such a user device 22 is able to manage one or more peripheral device lists and connection modes that enable a user to easily customize and control the wireless peripheral device connection behavior of the user device 22. In one mode which is hereinafter referred to as the "Scan for Known Only" mode, the user device 22 accesses a list of known peripheral device identifiers in order to connect only with known wireless peripheral devices 24 (i.e., listed wireless peripheral devices 24 that have previously connected with the user device 22) thereby eliminating the possibility of inadvertently connecting with a new wireless peripheral device 24 that belongs to someone else. In another mode which is hereinafter referred to as the "Scan for New Only" mode, the user device 22 accesses the list of known peripheral device identifiers in order to connect only with new wireless peripheral devices 24 (i.e., unlisted wireless peripheral devices 14 that have not previously connected with the user device 22) thereby enabling the user device 22 to purposefully connect with a previously unknown wireless peripheral device 24. Furthermore, the user device 22 may maintain a list of disregarded wireless peripheral devices 24 (e.g., wireless peripheral devices 24 that the user device 22 should ignore/disregard) that prevents the user device 22 from inadvertently connecting with an unwanted wireless peripheral device 24.

Based on the above-mentioned lists and modes, the wireless peripheral devices 24 are able to participate in smart discovery processes with the user device 22. During such a smart discovery process, the user device 22 scans for available wireless peripheral devices 24 (e.g., Bluetooth scanning). In response, if there is an available wireless peripheral device 24 in the vicinity, the wireless peripheral device 24 sends out an availability signal that includes an instance containing information regarding the wireless peripheral device 24. Such information includes a peripheral device identifier that uniquely identifies the wireless peripheral device 24 among other wireless peripheral devices 24.

Upon receipt of the instance containing information regarding the wireless peripheral device 24, the user device 22 determines whether user device 22 is allowed to connect with the wireless peripheral device 24 based on list information and mode information. Accordingly, the user device 22 is able to perform various smart operations such as a peripheral recognition operation that attempts to recognize the wireless peripheral device 24 and, based on a result of the peripheral recognition operation, a peripheral access operation that determines whether the user device 22 is allowed to connect with the wireless peripheral device 24.

If the user device 22 is allowed to connect with the wireless peripheral device 24, the user connects the user device 22 with the wireless peripheral device 24. As a result, the user is able to perform useful work on the user device 22 using the wireless peripheral device 24.

However, if the user device 22 is prevented from connecting with the wireless peripheral device 24, perhaps due to the scanning process discovering the wrong wireless peripheral device 24, the user device 22 is able to automatically repeat the discovery process so that the user device 22 ultimately connects with the correct wireless peripheral device 24.

One should appreciate that such operation prevents the user device 22 from inadvertently and/or repetitively connecting and pairing with the wrong peripheral device 24 (e.g., someone else's wireless accessory). Accordingly, the user does not need to tediously go through a burdensome disconnection/removal process to make the user device 22 forget the wrong peripheral device 24. Further details will now be provided with reference to FIG. 2.

Figure 2:
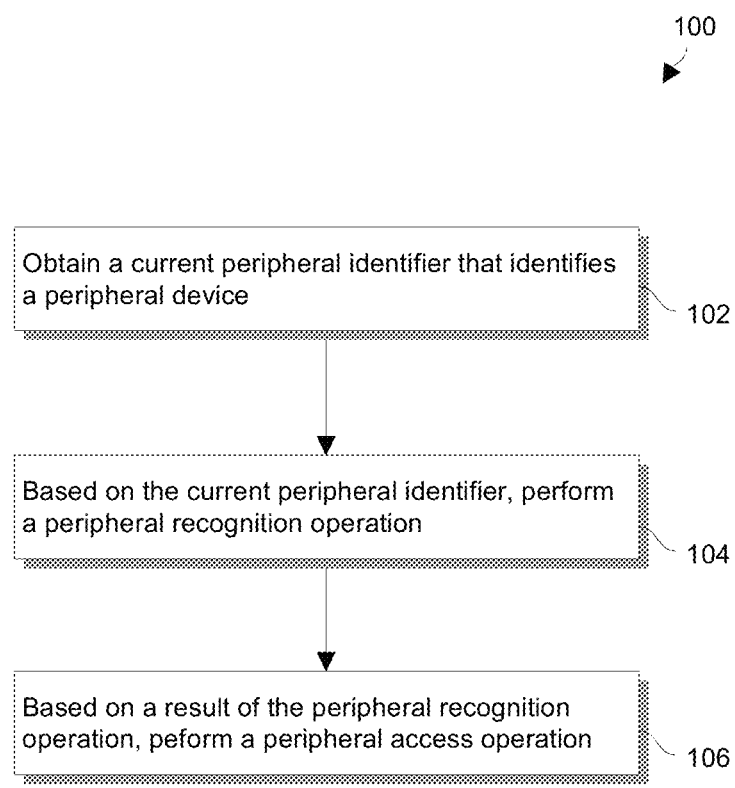
FIG. 2 is a flowchart of a procedure that is performed by a user device of the computing environment in accordance with certain embodiments.

FIG. 2 shows a procedure 100 which is performed on a user device in accordance with certain embodiments. The procedure 100 manages connection between the user device and a peripheral device. Such a procedure 100 may be performed by circuitry of the user device that is formed when the user device runs a specialized application such as a virtual desktop client application configured to provide access to a remote desktop session which is hosted by remote session equipment.

At 102, the circuitry of the user device obtains a current peripheral identifier from an operating system running on the user device. The current peripheral identifier uniquely identifies a discovered wireless peripheral device. Along these lines, the circuitry may call a discovery routine of the operating system that runs on the user device via an application programming interface (API). In response, the circuitry receives a discovery result indicating discovery of the peripheral device and including the current peripheral identifier.

For example, a virtual desktop client may invoke a Bluetooth peripheral scanning service of the operating system. In response, the virtual desktop client receives a wireless mouse instance containing a peripheral identifier that uniquely identifies a wireless mouse device among other wireless mouse devices.

At 104, based on the current peripheral identifier, the circuitry performs a peripheral recognition operation that attempts to recognize the wireless peripheral device. Along these lines, the user device may store a list of disregarded peripheral identifiers identifying disregarded peripheral devices and the circuitry performs a set of matching operations to determine whether the current peripheral identifier is on the list of disregarded peripheral identifiers. Additionally, the user device may store a list of known peripheral identifiers identifying known peripheral devices and the circuitry performs a set of comparison operations to determine whether the current peripheral identifier is on the list of known peripheral identifiers.

At 106, based on a result of the peripheral recognition operation, the circuitry performs a peripheral access operation that determines whether the user device is allowed to connect with the wireless peripheral device. For example, if a result of the peripheral recognition operation indicates that the current peripheral identifier is on the list of disregarded peripheral identifiers, the user device is prevented from connecting with the peripheral device. At this point, the user device may automatically continue to scan for another peripheral device (i.e., repeat 102 and 104).

However, suppose that the result of the peripheral recognition operation indicates that the current peripheral identifier is not on the list of disregarded peripheral identifiers. In such a situation, if the user device is set to operate in the "Scan for Known Only" mode and the result of the peripheral recognition operation indicates that the current peripheral identifier is not on the list of known peripheral identifiers, the user device may automatically continue to scan for another peripheral device (i.e., repeat 102 and 104). Similarly, if the user device is set to operate in the "Scan for New Only" mode and the result of the peripheral recognition operation indicates that the current peripheral identifier is on the list of known peripheral identifiers, the user device may automatically continue to scan for another peripheral device (i.e., repeat 102 and 104).

Furthermore, the result of the peripheral recognition operation may qualify the user device to connect with the peripheral device. For example, if the user device is set to operate in the "Scan for Known Only" mode and the result of the peripheral recognition operation indicates that the current peripheral identifier is on the list of known peripheral identifiers, the user device is then allowed to connect with the peripheral device. Likewise, if the user device is set to operate in the "Scan for New Only" mode and the result of the peripheral recognition operation indicates that the current peripheral identifier is not on the list of known peripheral identifiers, then the user device is allowed to connect with the peripheral device.

When the user device is allowed to connect with the peripheral device, the circuitry may prompt the user for permission to connect with the peripheral device. If the user denies such permission, the circuitry prevents the user device from connecting with the peripheral device and may subsequently prompt the user on whether to add the current peripheral identifier to the list of disregarded peripheral identifiers. However, if the user provides such permission, the circuitry directs the operating system to connect with the peripheral device and may add the current peripheral identifier to the list of known peripheral identifiers if the current peripheral identifier is not already on this known peripheral list.

It should be understood that when the user device adds a peripheral identifier to a particular list, the user device may check to see whether the peripheral identifier is listed elsewhere and perhaps make adjustments to avoid unexpected anomalies. For example, when the user device adds a peripheral identifier to the known peripheral list, the user device may remove the peripheral identifier from disregarded peripheral list if the peripheral identifier was on the disregarded peripheral list. Moreover, the user device ensures that the peripheral identifier appears no more than once in the lists (e.g., the same peripheral identifier cannot occur multiple times on the same list).

Additionally, the situation may arise where the user wishes to disregard a first known peripheral device in order to connect with a second known peripheral device but still keep the peripheral identifier that identifies the first known peripheral device on the known peripheral list for future operation. In such a situation, the user may direct the user device not to remove the peripheral identifier that identifies the first known peripheral device from the known peripheral list.

It should be further understood that the connection capabilities provided by the user device are flexible and that user is able to setup, modify, or otherwise control the connection behavior of the user device at any time. For example, the user may switch connection modes at any time, i.e., from "Scan for Known Only" mode to "Scan for New Only" mode, vice versa, etc. Additionally, the user may delete peripheral identifiers from any of the lists, move peripheral identifiers between the lists, and so on. Such ability provides rich and reliable real-time control over the connection behavior of the user device. Further details will now be provided with reference to FIG. 3.

Figure 3:
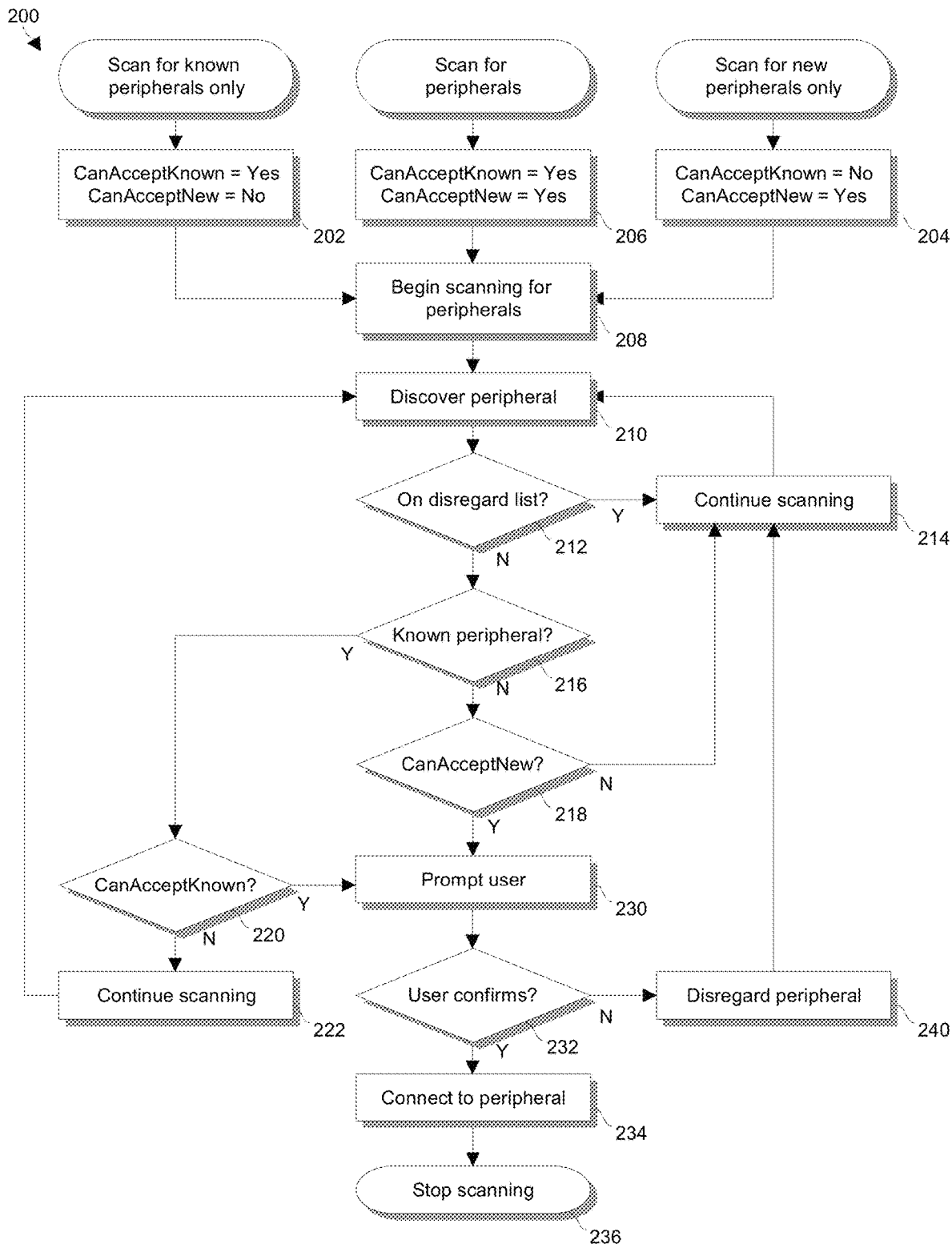
FIG. 3 is a flowchart of a detailed procedure in accordance with certain embodiments.

FIG. 3 shows, in accordance with certain embodiments, a detailed procedure 200 for managing connection between a user device and a peripheral device. Such a procedure 200 enables the user device to manage such connection effectively and efficiently.

By way of example, the procedure 200 may be performed by a virtual desktop client that provides remote desktop sessions in coordination with remote session equipment (e.g., also see FIG. 1). Recall that it was explained earlier that the software for such a virtual desktop client as well as other applications may be downloaded and installed from another device in the computing environment 20 (e.g., see the storefront server 28 in FIG. 1).

The procedure 200 begins with circuitry being directed to connect with a peripheral device. Such direction may be responsive to an event such as a user invoking an application or service (i.e., upon command), based on a timer, etc. For example, a virtual desktop client may direct the operating system of the user device to scan for an external mouse device when the virtual desktop client application is launched.

At 202, if the circuitry is currently configured to connect with known peripheral devices only, the circuitry sets control parameters so that the user device operates in "Scan for Known Only" mode. In particular, in "Scan for Known Only" mode, the circuitry sets a CanAcceptKnown parameter to YES, and a CanAcceptNew parameter to NO.

Alternatively, at 204, if the circuitry is currently configured to connect with new peripheral devices only, the circuitry sets the control parameters so that the user device operates in "Scan for New Only" mode. In particular, in "Scan for New Only" mode, the circuitry sets the CanAcceptKnown parameter to NO, and the CanAcceptNew parameter to YES.

Other modes may be available as well. For example, at 206, if the circuitry is currently configured to connect with any peripheral device, the circuitry sets the control parameters so that the user device operates in "Scan for Peripherals" mode. In particular, in "Scan for Peripherals" mode, the circuitry sets the CanAcceptKnown parameter to YES, and the CanAcceptNew parameter to YES.

After the circuitry sets the control parameters, the circuitry proceeds to 208. At 208, the circuitry directs the operating system via an API call to scan for peripherals. In accordance with certain embodiments, the user device attempts to discover an available Bluetooth device. 208 then proceeds to 210.

At 210, when the operating system discovers a peripheral, the operating system returns, through the API, an instance of peripheral data that the operating system received while scanning. In particular, such an instance includes a peripheral identifier that uniquely identifies the peripheral (also see 102 in FIG. 2) and perhaps other information. For example, in the context of a wireless mouse device, the instance includes a peripheral identifier that identifies a particular wireless mouse device among other wireless mouse devices and perhaps other information such as whether the particular wireless mouse device is capable of operating in an extra protocol mode. 210 then proceeds to 212.

At 212, the circuitry of the user device determines whether the peripheral identifier is on a list of disregarded peripheral identifiers that is stored on the user device. In particular, the circuitry performs a set of matching operations that attempt to match the current peripheral identifier with a peripheral identifier on the disregarded peripheral list. If the current peripheral identifier is on the disregarded peripheral list, 212 proceeds to 214. However, if the current peripheral identifier is not on the disregarded peripheral list, 212 proceeds to 216.

At 214, the circuitry directs (or allows) the operating system via the API call to continue scanning for another peripheral. 214 then proceeds back to 210.

At 216, since the current peripheral identifier is not on the disregarded peripheral list, the circuitry determines whether the peripheral identifier is on the list of known peripheral identifiers that is stored on the user device. In particular, the circuitry performs a set of comparison operations that attempt to compare the current peripheral identifier with a peripheral identifier on the known peripheral list. If the current peripheral identifier is not on the known peripheral list, 216 proceeds to 218. However, if the current peripheral identifier is on the known peripheral list, 216 proceeds to 220.

At 218, since the current peripheral identifier is not on the known peripheral list, the circuitry evaluates whether the CanAcceptNew parameter is set to YES. If the CanAcceptNew parameter is set to YES, the circuitry allows the user device to connect with the peripheral device and 218 proceeds to 230. However, if the CanAcceptNew parameter is set to NO, the circuitry prevents the user device from connecting with the peripheral device and 218 proceeds to 214 for continued scanning.

At 220, since the current peripheral identifier is on the known peripheral list, the circuitry evaluates whether the CanAcceptKnown parameter is set to YES. If the CanAcceptKnown parameter is set to YES, the circuitry allows the user device to connect with the peripheral device and 220 proceeds to 230. However, if the CanAcceptKnown parameter is set to NO, the circuitry prevents the user device from connecting with the peripheral device and 220 proceeds to 222.

At 222, the circuitry directs (or allows) the operating system via the API call to continue scanning for another peripheral. 222 then proceeds back to 210.

At 230, the circuitry has allowed the user device to connect with the peripheral device. Accordingly, the circuitry prompts the user for permission to connect with the peripheral device. Such prompting may be effectuated via a variety of different mechanisms depending on the type of peripheral device (e.g., wireless external mouse device, wireless headphones, wireless printer, etc.) and which type or types of I/O resources are already in use (e.g., a keyboard, a depressible button, a switch, a touchscreen, a touchpad, etc.). For example, if the peripheral device is a wireless mouse device and the user device has a touchscreen, the user device may render a button on the touchscreen which prompts the user for connection confirmation. 230 then proceeds to 232.

At 232, the circuitry awaits a decision from the user. If the user confirms that the user device should connect with the peripheral device, 232 proceeds to 234. However, if the user withholds confirmation (e.g., by rejecting the prompt, by entering a negative decision, by allowing the prompt to expire after a predefined amount of time elapses, etc.) indicating that the user device should not connect with the peripheral device, 232 proceeds to 240.

At 234, the circuitry connects with the peripheral device. If the current peripheral identifier is not yet on the known peripheral list, the circuitry may add the current peripheral identifier to the known peripheral list. 234 then proceeds to 236.

At 236, since the user device has connected with the peripheral device, the circuitry directs the operating system to stop scanning. At this point, the user is able to properly use the peripheral device with the user device. For example, in the context of a wireless external mouse device, the user is able to move the wireless mouse device in order to control operation of a pointer (or cursor) on a display.

At 240, if the user withheld confirmation or provided negative input, the circuitry disregards the peripheral device. In particular, the circuitry prevents the user device from connecting with the peripheral device and optionally adds the current peripheral identifier to the disregarded peripheral list. 240 then proceeds to 214 to continue scanning for another peripheral device. In some arrangements, there is a separate user interface (UI) exchange (e.g., user prompt and confirmation) before the circuitry adds the current peripheral identifier to the disregarded peripheral list.

It should be understood that, in accordance with certain embodiments, the procedure 200 may include a variety of additional features, alternatives, abilities to override, and so on. For example, in accordance with certain embodiments, use of the disregarded peripheral list is optional and may be eliminated from use. Alternatively and as just mentioned, at 240, the circuitry may not automatically add the current peripheral identifier to the disregarded peripheral list but instead may prompt the user for permission to add the current peripheral identifier to the disregarded peripheral list. Similarly, at 234, the circuitry may not automatically add the current peripheral identifier to the known peripheral list but instead may prompt the user for permission to add the current peripheral identifier to the known peripheral list, etc.

Additionally, in accordance with certain embodiments, the user may configure the circuitry to not prompt the user at 230 when a particular peripheral device is discovered during scanning but already known. Rather, the circuitry may be configured to automatically connect with that peripheral device once the user device has discovered the known peripheral device.

Furthermore, it should be understood that, in accordance with certain embodiments, the user is able to make changes, adjustments, etc. to the different lists. For example, the user is able to delete one or more peripheral identifiers from the disregarded peripheral list and/or from the known peripheral list. Additionally, the user is able to reset the lists themselves (i.e., delete the lists, erase all of the identifiers from the lists, etc.). Moreover, the user is able to move identifiers between the lists (i.e., off one list and on to the other list), add names to the peripheral devices identified in one or more lists, and so on. Further details will now be provided with reference to FIG. 4.

Figure 4:
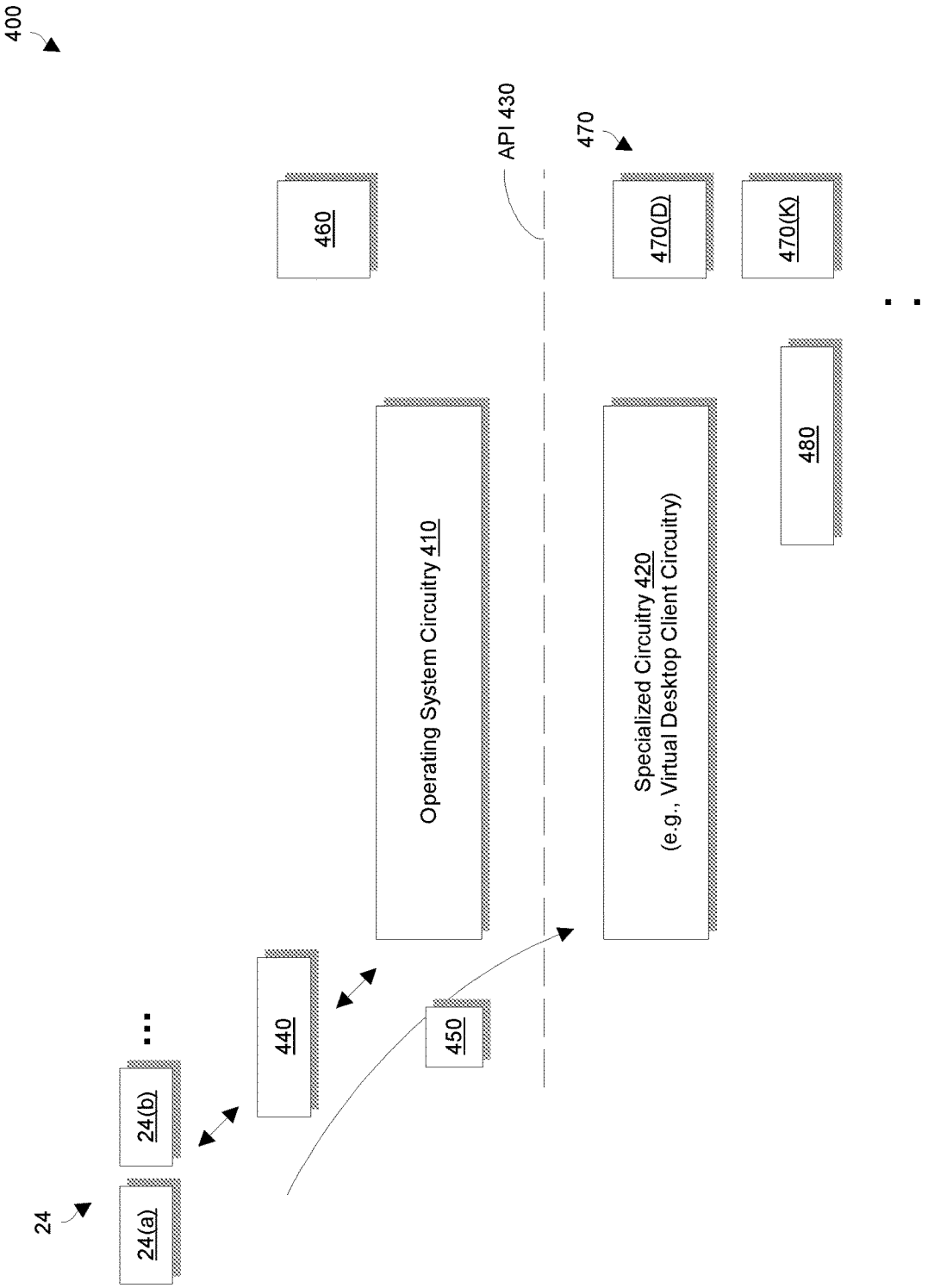
FIG. 4 is a block diagram illustrating certain details of a user device in accordance with certain embodiments.

FIG. 4 shows certain user device details in accordance with certain embodiments. In particular, FIG. 4 shows an example situation 400 which involves operating system circuitry 410 and specialized circuitry 420 communicating through an API 430. The operating system circuitry 410 is formed by processing circuitry of a user device running in accordance with an operating system. The specialized circuitry 420 is formed by processing circuitry of the user device running in accordance with another application such as a virtual desktop client application.

The operating system circuitry 410 is constructed and arranged to access particular resources 440 of the user device. Along these lines, the operating system circuitry 410 accesses a wireless transceiver (or similar wireless communications interface) that is able to scan and eventually connect with one or more wireless peripheral devices 24(a), 24(b), . . . (collectively, wireless peripheral devices 24) in the vicinity.

At various times, the operating system circuitry 410 is able to receive an instance 450 containing peripheral device information from a wireless peripheral device 24 and provide that instance 450 to the specialized circuitry 420. For example, the operating system circuitry 410 may return the instance 450 to the specialized circuitry 420 as a discovery result while scanning, as a connection result after connecting with the peripheral device 24, as a query result after querying the peripheral device 24 for services/characteristics offered by the peripheral device 24, and so on.

Such an instance 450 includes a peripheral identifier which uniquely identifies the wireless peripheral device 24 among other wireless peripheral devices 24 (e.g., a serial number, a key, a unique hash, a hexadecimal code, combinations thereof, etc.). Additionally, such an instance 450 may optionally include other information such as a name of the peripheral type, a standard service identifier that identifies a peripheral device type (e.g., a mouse, headphones, a printer, etc.), a custom service identifier that identifies particular types of capabilities of the wireless peripheral device 24 (e.g., a standard mouse mode, an augmented mouse mode, etc.), a version string that identifies the version of the software/firmware on the wireless peripheral device 24, a battery level or value that identifies the capacity left on the battery of the wireless peripheral device 24, and so on.

As further shown in FIG. 4, the operating system circuitry 410 may maintain a paired devices list 460 that identifies peripheral devices 24 that the operating system circuitry 410 has previously paired with (e.g., via Bluetooth pairing). The user may be able to manually direct the operating system circuitry 410 to add a peripheral identifier to the operating system's paired devices list 460 (e.g., by commanding the operating system to connect or pair with a peripheral device 24) and delete a peripheral identifier from the operating system's paired devices list 460 (e.g., by commanding the operating system to forget a peripheral device 24).

The specialized circuitry 420 maintains a set of peripheral device lists 470 each of which is different from the operating system's paired devices list 460. The set of peripheral device lists 470 includes a list of disregarded peripheral devices 470(D) and a list of known peripheral devices 470(K). The disregarded peripheral list 470(D) includes peripheral identifiers that identify peripheral devices 24 that the user device should disregard. Additionally, the known peripheral list 470(K) includes peripheral identifiers that identify peripheral devices 24 that the user device already knows. Furthermore, the specialized circuitry 420 maintains control parameters 480 (e.g., a CanAcceptKnown parameter, a CanAcceptNew parameter, etc.) that the specialized circuitry 420 may set based on which connection behavior mode the user has set for the specialized circuitry 420 (e.g., "Scan for Known Only" mode, "Scan for New Only" mode, etc.). It should be understood that other lists 470, other control parameters 480, and other connection behavior modes are suitable for use as well.

During operation, the specialized circuitry 420 sets the various control parameters 480 as just mentioned (e.g., also see 202-206 in FIG. 3). The particular values of these control parameters 480 depends on the current connection behavior mode set for user device (e.g., to connect only to known peripheral devices, to connect only to new peripheral devices, to connect to any peripheral devices, etc.).

Also, the specialized circuitry 420 is able to direct the operating system circuitry 410 to perform scanning (e.g., see 208 in FIG. 3) as well as discontinue scanning (e.g., see 236 in FIG. 3). Other API calls are available as well such as calls that direct the operating system circuitry 410 to connect the user device with a peripheral device 24, calls to query a connected peripheral device 24 for certain services and/or characteristics, etc.

Additionally, to determine whether a discovered peripheral device is to be disregarded, the specialized circuitry 420 is able to access the list of disregarded peripheral devices 470(D) (e.g., see 212 in FIG. 3). Furthermore, to determine whether a discovered peripheral device is known, the specialized circuitry 420 is able to access the list of known peripheral devices 470(K) (e.g., see 216 in FIG. 3).

Moreover, the specialized circuitry 420 is able to update the lists 470 in response to input from the user depending on whether the user confirms that the user device should connect with a discovered peripheral device 24. In particular, the specialized circuitry 420 may add a peripheral identifier to the list of disregarded peripheral devices 470(D) (e.g., see 240 in FIG. 3). Similarly, the specialized circuitry 420 may add a peripheral identifier to the list of known peripheral devices 470(D) (e.g., see 234 in FIG. 3). Also, the user may manually modify the lists 470 (e.g., move a peripheral identifier from one list 470 to another), and so on. Further details will now be provided with reference to FIG. 5.

Figure 5:
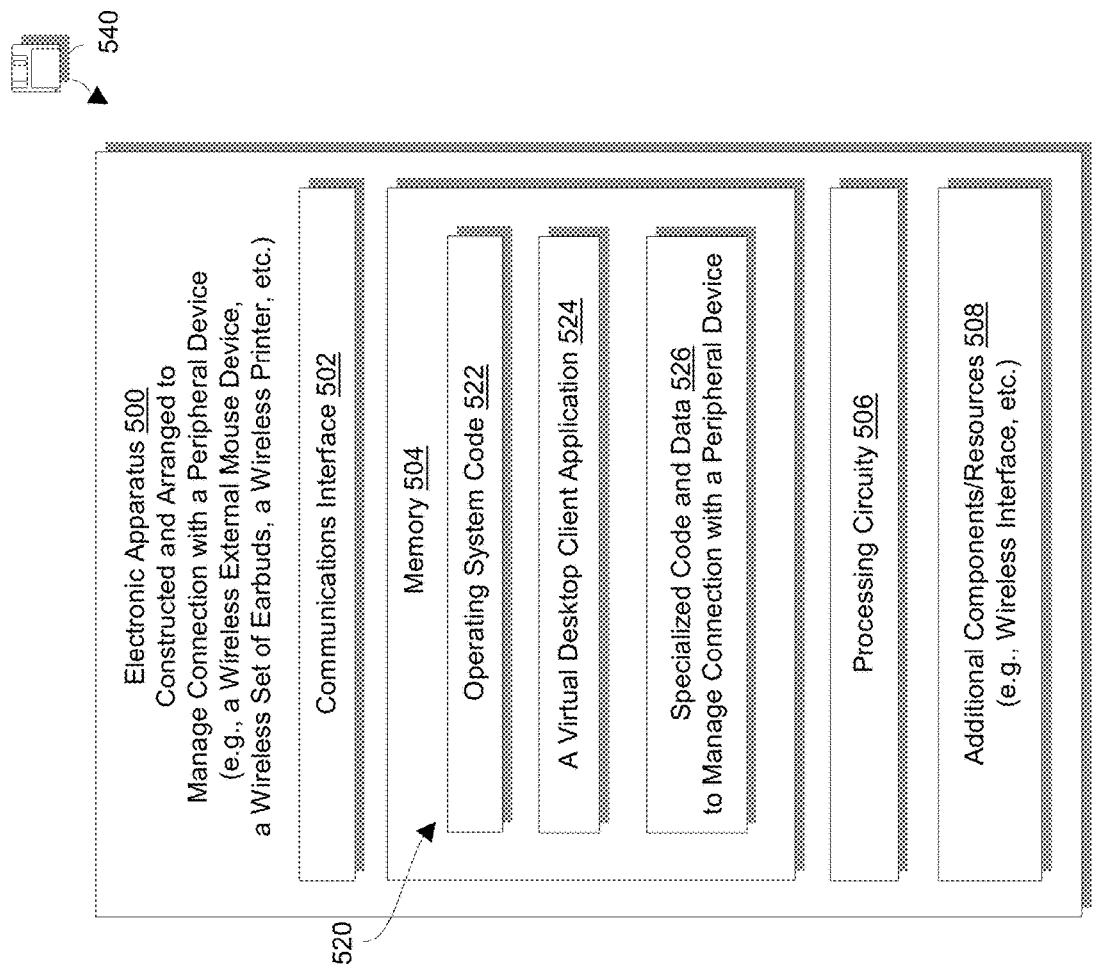
FIG. 5 is a block diagram of an electronic apparatus which is suitable for a user device of the computing environment in accordance with certain embodiments.

FIG. 5 shows an electronic apparatus 500 which is suitable for use as at least a portion of a user device 22. The electronic apparatus 500 is constructed and arranged to operate as a virtual desktop client which accesses a remote desktop. As shown in FIG. 5, the electronic apparatus 500 includes a communications interface 502, memory 504, processing circuitry 506, and a set of additional components/resources 508.

The communications interface 502 is constructed and arranged to connect the electronic apparatus 500 to the communications medium 32 (also see FIG. 1). Accordingly, the communications interface 502 enables the electronic apparatus 500 to communicate with the other components of the computing environment 20 such as the remote session equipment 26 and the storefront server 28. Such communications may be line-based, wireless, combinations thereof, and so on. Moreover, such communications may utilize a variety of protocols (e.g., IP, cellular, fiber optic, RF, etc.).

The memory 504 is intended to represent both volatile storage (e.g., DRAM, SRAM, etc.) and non-volatile storage (e.g., flash memory, magnetic disk drives, etc.). The memory 504 stores a variety of software constructs 520 including an operating system 522, a virtual desktop client application 524, and specialized code and data 526 to manage connection with a set of peripheral devices 24 (also see FIG. 1).

The processing circuitry 506 is constructed and arranged to operate in accordance with the various software constructs 520 stored in the memory 504. In particular, the processing circuitry 506, when executing the operating system 522, manages various resources of the electronic equipment 500 (e.g., memory allocation, processor cycles, hardware compatibility, Bluetooth services, etc.). Additionally, the processing circuitry 506, when operating in accordance with the virtual desktop client application 524, is constructed and arranged to form specialized control circuitry that provides access to a remote desktop environment. Furthermore, the processing circuitry 506, when operating in accordance with the specialized code and data 526, is constructed and arranged to manage connection with one or more peripheral devices 24, etc.

In accordance with some embodiments, the specialized code and data 526 is integrated with the virtual desktop client application 524. In accordance with other embodiments, the specialized code and data 526 and the virtual desktop client application 524 are separate and may operate independently, may be installed separately, etc.

It should be understood that the above-mentioned processing circuitry 506 may be implemented in a variety of ways including one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 540 is capable of delivering all or portions of the software to the electronic apparatus 500. The computer program product 540 has a non-transitory and non-volatile computer readable medium that stores a set of instructions to control one or more operations of the electronic apparatus 500. Examples of suitable computer readable storage media include tangible articles of manufacture and apparatus that store instructions in a non-volatile manner such as CD-ROM, flash memory, disk memory, tape memory, and the like.

The additional components/resources 508 refers to various other componentry such as a wireless communications interface that enables the electronic apparatus 500 to scan for, discover, connect with, and further utilize one or more wireless peripheral devices 24. The additional components/resources 508 may include other componentry such as a display, a keyboard, etc.

During operation, the processing circuitry 506 when executing the virtual desktop client application 524 forms specialized circuitry that enables the electronic apparatus 500 to establish and operate a remote desktop session. Accordingly, the user is able to utilize a remote desktop to perform useful work.

Additionally, the processing circuitry 506 when executing in accordance with the specialized code and data 526 forms specialized circuitry that enables the electronic apparatus 500 to manage connection with a peripheral device 24 (e.g., also see FIGS. 2 through 4). Accordingly, the user is able to elegantly control connection behavior rather than repeatedly inadvertently connect to a wrong wireless accessory. Further details will now be provided with reference to FIG. 6.

Figure 6:
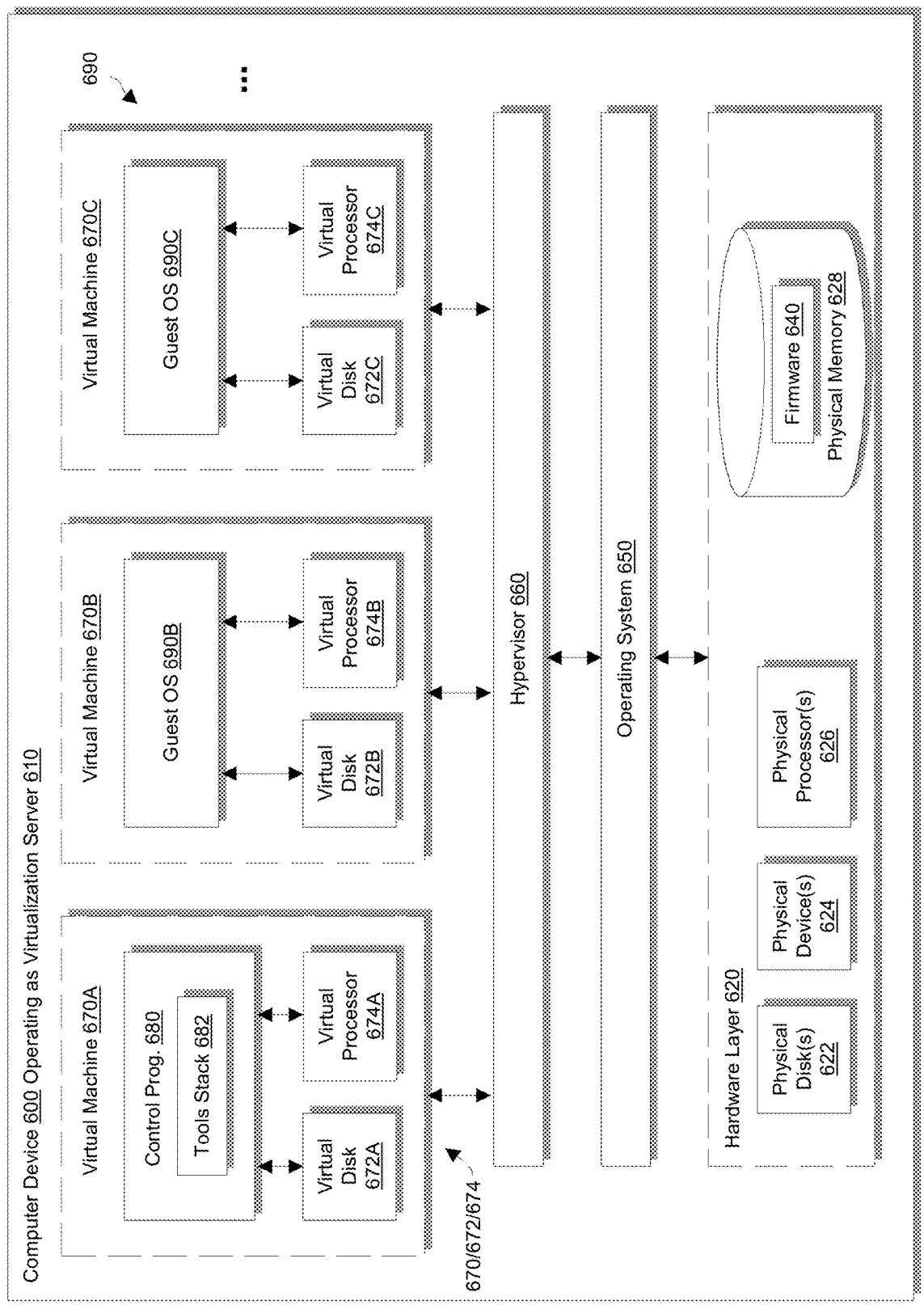
FIG. 6 is a block diagram of a virtualization server which is suitable for remote session equipment of the computing environment in accordance with certain embodiments.

FIG. 6 shows a high-level architecture of an illustrative desktop virtualization system. Such a system is suitable for use as at least a portion of the remote session equipment 26 (also see FIG. 1).

As shown in FIG. 6, the desktop virtualization system may be a single-server or multi-server system, or a cloud system, including at least one computer device 600 operating as a virtualization server 610 configured to provide virtual desktops and/or virtual applications to one or more client access devices (e.g., user devices 22). As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

The computer device 600 may be configured as a virtualization server in a virtualization environment, for example, a single-server, multi-server, or cloud computing environment. Virtualization server 610 illustrated in FIG. 6 may be deployed as and/or implemented by one or more embodiments of the earlier-mentioned remote session equipment 26 or by other known computing devices. Included in virtualization server 610 is hardware layer 620 that may include one or more physical disks 622, one or more physical devices 624, one or more physical processors 626, and one or more physical memories 628. In some embodiments, firmware 640 may be stored within a memory element in physical memory 628 and be executed by one or more of physical processors 626. Virtualization server 610 may further include operating system 650 that may be stored in a memory element in physical memory 628 and executed by one or more of physical processors 626. Still further, hypervisor 660 may be stored in a memory element in physical memory 328 and be executed by one or more of physical processors 326. Presence of operating system 650 may be optional such as in a case where the hypervisor 660 is a Type A hypervisor.

Executing on one or more of physical processors 626 may be one or more virtual machines 670A, 670B, 670C, . . . (generally, VMs 670). The VMs 670A, 670B, 670C, . . . respective virtual disks 672A, 672B, 672C, . . . (generally, virtual disks 672) and respective virtual processors 674A, 674B, 674C, . . . (generally, virtual processors 674). In some embodiments, the first VM 670A may execute, using virtual processor 674A, control program 680 that includes tools stack 682. Control program 680 may be referred to as a control virtual machine, Domain 0, Dom0, or other virtual machine used for system administration and/or control. In some embodiments, one or more VMs 670B, 670C, . . . may execute, using their respective virtual processors 674B, 674C, guest operating systems 690B, 690C, . . . (generally, guest operating systems 690).

Physical devices 624 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 610. Physical memory 628 in hardware layer 620 may include any type of memory. Physical memory 628 may store data, and in some embodiments may store one or more programs, or set of executable instructions. FIG. 6 illustrates an embodiment where firmware 640 is stored within physical memory 628 of virtualization server 610. Programs or executable instructions stored in physical memory 628 may be executed by the one or more processors 626 of virtualization server 610.

Virtualization server 610 may also include hypervisor 660. In some embodiments, hypervisor 660 may be a program executed by processors 626 on virtualization server 610 to create and manage any number of virtual machines 670. Hypervisor 660 may be referred to as a virtual machine monitor, or platform virtualization software. In some embodiments, hypervisor 660 may be any combination of executable instructions and hardware that monitors virtual machines 670 executing on a computing machine. Hypervisor 660 may be a Type 2 hypervisor, where the hypervisor executes within operating system 650 executing on virtualization server 610. Virtual machines may then execute at a layer above hypervisor 660. In some embodiments, the Type 2 hypervisor may execute within the context of a user's operating system such that the Type 2 hypervisor interacts with the user's operating system. In other embodiments, one or more virtualization servers 610 in a virtualization environment may instead include a Type 1 hypervisor (not shown). A Type 1 hypervisor may execute on virtualization server 610 by directly accessing the hardware and resources within hardware layer 610. That is, while Type 2 hypervisor 660 accesses system resources through host operating system 650, as shown, a Type 1 hypervisor may directly access all system resources without host operating system 610. A Type 1 hypervisor may execute directly on one or more physical processors 626 of virtualization server 610, and may include program data stored in physical memory 628.

Hypervisor 650, in some embodiments, may provide virtual resources to guest operating systems 690 or control programs 680 executing on virtual machines 670 in any manner that simulates operating systems 690 or control programs 680 having direct access to system resources. System resources can include, but are not limited to, physical devices 622, physical disks 624, physical processors 626, physical memory 628, and any other component included in hardware layer 620 of virtualization server 610. Hypervisor 660 may be used to emulate virtual hardware, partition physical hardware, virtualize physical hardware, and/or execute virtual machines that provide access to computing environments. In still other embodiments, hypervisor 660 may control processor scheduling and memory partitioning for virtual machines 670 executing on virtualization server 610. Examples of hypervisor 660 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. In some embodiments, virtualization server 610 may execute hypervisor 660 that creates a virtual machine platform on which guest operating systems 690 may execute. In these embodiments, virtualization server 610 may be referred to as a host server. An example of such a virtualization server is Citrix Hypervisor® provided by Citrix Systems, Inc., of Fort Lauderdale, Fla.

Hypervisor 660 may create one or more virtual machines 670 in which guest operating systems 690 execute. In some embodiments, hypervisor 660 may load a virtual machine image to create virtual machine 670. The virtual machine image may refer to a collection of data, states, instructions, etc. that make up an instance of a virtual machine. In other embodiments, hypervisor 660 may execute guest operating system 690 within virtual machine 670. In still other embodiments, virtual machine 670 may execute guest operating system 690.

In addition to creating virtual machines 670, hypervisor 660 may control the execution of at least one virtual machine 670. In other embodiments, hypervisor 660 may present at least one virtual machine 670 with an abstraction of at least one hardware resource provided by virtualization server 610 (e.g., any hardware resource available within hardware layer 610). In other embodiments, hypervisor 660 may control the manner in which virtual machines 670 access physical processors 626 available in virtualization server 610. Controlling access to physical processors 626 may include determining whether virtual machine 670 should have access to processor 626, and how physical processor capabilities are presented to virtual machine 670.

As shown in FIG. 6, virtualization server 610 may host or execute one or more virtual machines 670. Virtual machine 670 may be a set of executable instructions and/or user data that, when executed by processor 626, may imitate the operation of a physical computer such that virtual machine 670 can execute programs and processes much like a physical computing device. While FIG. 6 illustrates an embodiment where virtualization server 610 hosts three virtual machines 670, in other embodiments virtualization server 610 may host any number of virtual machines 670. Hypervisor 660, in some embodiments, may provide each virtual machine 670 with a unique virtual view of the physical hardware, including memory 628, processor 626, and other system resources 622, 624 available to that virtual machine 670. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 660 may create one or more unsecure virtual machines 670 and one or more secure virtual machines 670. Unsecure virtual machines 670 may be prevented from accessing resources, hardware, memory locations, and programs that secure virtual machines 670 may be permitted to access. In other embodiments, hypervisor 610 may provide each virtual machine 670 with a substantially similar virtual view of the physical hardware, memory, processor, and other system resources available to virtual machines 670.

Each virtual machine 670 may include a respective virtual disk 672 and respective virtual processor 674. Virtual disk 672, in some embodiments, may be a virtualized view of one or more physical disks 622 of virtualization server 610, or a portion of one or more physical disks 622 of virtualization server 610. The virtualized view of physical disks 622 may be generated, provided, and managed by hypervisor 660. In some embodiments, hypervisor 660 may provide each virtual machine 670 with a unique view of physical disks 622. Thus, in these embodiments, particular virtual disk 622 included in each virtual machine 670 may be unique when compared with other virtual disks 672.

Virtual processor 674 may be a virtualized view of one or more physical processors 626 of virtualization server 610. In some embodiments, the virtualized view of physical processors 626 may be generated, provided, and managed by hypervisor 660. In some embodiments, virtual processor 674 may have substantially all of the same characteristics of at least one physical processor 626. In other embodiments, virtual processor 674 may provide a modified view of physical processors 626 such that at least some of the characteristics of virtual processor 674 are different from the characteristics of the corresponding physical processor 626.

As described above, improved techniques are directed to managing connection between a user device 22 and a peripheral device 24 based on a peripheral identifier. To this end, the user device 22 manages one or more peripheral device lists and connection modes that enable a user to easily customize and control the connection behavior of the user device 22.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the remote session equipment 26 and/or the storefront server 28 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

In accordance with certain embodiments, it should be appreciated that the Citrix Workspace App for iOS uses the Bluetooth API to communicate with a particular version of a Citrix X1 Mouse, referred to below as the peripheral. The pairing of the peripheral with the device is managed by the operating system and happens only if needed when the application attempts to connect to a discovered peripheral. This may make it awkward or even impossible for the app to determine whether the peripheral being connected to is already one that is paired with the device or one that will require pairing. This can lead to situations where the operating system (on the behalf of the app) will receive pairing requests from nearby peripherals but not necessarily in the control of the user or anyway the intended ones, thus causing unwanted pairing requests.

Certain improvements disclosed herein solve this problem by keeping a list of known/preferred peripherals as well as a list of disregarded/unwanted peripherals. Under normal conditions, the app will only connect to discovered peripherals that are in the known list, thus avoiding connections and pairing requests from unwanted peripherals. When the user wants to connect to a new peripheral they will indicate as such, at which point the app will connect to a peripheral only if it is neither in the known list nor in the disregarded list. Once the user confirms, the connection will be made and the peripheral will be added to the known list. If by any chance the new peripheral connected to is still not the one the user was attempting to pair with, the user will have the option to add the peripheral to the disregarded list instead, thus allowing the app to ignore that peripheral next time it is discovered. The user will have the option to add or remove peripherals from both the known as well as the disregarded list.

It should be appreciated that various arrangements may be implemented in any app or operating system that communicates with Bluetooth devices, as a way to better manage the pairing process. Such peripherals can include mice, keyboards, headsets, speakers, etc. Such arrangements, modifications and enhancements are intended to belong to various embodiments of the disclosure.

What is claimed is:

1. A method of managing connection between a user device and a peripheral device, the method comprising:
obtaining a current peripheral identifier from an operating system running on the user device, the current peripheral identifier identifying the peripheral device;
based on the current peripheral identifier, performing a peripheral recognition operation that attempts to recognize the peripheral device; and based on a result of the peripheral recognition operation, performing a peripheral access operation that determines whether the user device is allowed to connect with the peripheral device, wherein obtaining the current peripheral identifier from the operating system includes:
calling a discovery routine of the operating system via an application programming interface (API) of the operating system, and
receiving a discovery result via the API of the operating system in response to calling the discovery routine, the discovery result indicating discovery of the peripheral device and including the current peripheral identifier;

wherein calling the discovery routine includes:
invoking, as the discovery routine, a Bluetooth peripheral scanning service of the operating system, the Bluetooth peripheral scanning service being configured to scan for Bluetooth available peripheral devices; and wherein receiving the discovery result includes:
acquiring a discovery notification message from the Bluetooth peripheral scanning service, the discovery notification message (i) indicating discovery of a Bluetooth peripheral device as the peripheral device and (ii) containing a Bluetooth peripheral device instance that includes the current peripheral identifier.

2. The method as in claim 1 wherein the peripheral device is a pointer apparatus configured to operate a remote desktop session provided by a virtual desktop client running on the user device;
wherein the discovery result further includes a current custom service identifier that is different from the current peripheral identifier;
wherein calling the discovery routine includes:
invoking the discovery routine from the virtual desktop client running on the user device; and
wherein receiving the discovery result includes:
comparing, by the virtual desktop client, the current custom service identifier with an expected custom service identifier to verify that the peripheral device is the pointer apparatus configured to operate the remote desktop session provided by the virtual desktop client running on the user device.

3. The method as in claim 1 wherein the user device stores a list of known peripheral identifiers identifying known peripheral devices; and
wherein performing the peripheral recognition operation includes:
performing a set of comparison operations to determine whether the current peripheral identifier is on the list of known peripheral identifiers.

4. The method as in claim 3, further comprising:
prior to performing the peripheral recognition operation, ascertaining a current recognition mode for the user device, the current recognition mode indicating whether the user device is currently configured to connect with known peripheral devices.

5. The method as in claim 4 wherein the result of the peripheral recognition operation indicates that the set of comparison operations determined that the current peripheral identifier is on the list of known peripheral identifiers;
wherein the current recognition mode indicates that the user device is currently configured to connect with known peripheral devices; and
wherein performing the peripheral access operation includes:
allowing the user device to connect with the peripheral device.

6. The method as in claim 4 wherein the result of the peripheral recognition operation indicates that the set of comparison operations determined that the current peripheral identifier is on the list of known peripheral identifiers;
wherein the current recognition mode indicates that the user device is currently configured to not connect with known peripheral devices; and
wherein performing the peripheral access operation includes:
preventing the user device from connecting with the peripheral device.

7. The method as in claim 4 wherein the result of the peripheral recognition operation indicates that the set of comparison operations determined that the current peripheral identifier is not on the list of known peripheral identifiers;
wherein the current recognition mode indicates that the user device is currently configured to connect with unknown peripheral devices; and
wherein performing the peripheral access operation includes:
allowing the user device to connect with the peripheral device.

8. The method as in claim 4 wherein the result of the peripheral recognition operation indicates that the set of comparison operations determined that the current peripheral identifier is not on the list of known peripheral identifiers;
wherein the current recognition mode indicates that the user device is currently configured to not connect with unknown peripheral devices; and
wherein performing the peripheral access operation includes:
preventing the user device from connecting with the peripheral device.

9. The method as in claim 1 wherein the user device stores a list of disregarded peripheral identifiers identifying disregarded peripheral devices; and
wherein performing the peripheral recognition operation includes:
performing a set of matching operations to determine whether the current peripheral identifier is on the list of disregarded peripheral identifiers.

10. The method as in claim 9 wherein the result of the peripheral recognition operation indicates that the set of matching operations determined that the current peripheral identifier is on the list of disregarded peripheral identifiers; and
wherein performing the peripheral access operation includes:
preventing the user device from connecting with the peripheral device.

11. The method as in claim 9 wherein the result of the peripheral recognition operation indicates that the set of matching operations determined that the current peripheral identifier is not on the list of disregarded peripheral identifiers; and
wherein performing the peripheral access operation includes:
allowing the user device to connect with the peripheral device.

12. The method as in claim 11, further comprising:
after the user device is allowed to connect with the peripheral device, providing a connection prompt that asks a user whether the user device should connect with the peripheral device.

13. The method as in claim 12, further comprising:
after providing the connection prompt, receiving a connection instruction from the user, the connection instruction instructing the user device to connect with the peripheral device, and
in response to the connection instruction instructing the user device to connect with the peripheral device, connecting the user device with the peripheral device and adding the current peripheral identifier to the list of known peripheral identifiers.

14. The method as in claim 12, further comprising:
after providing the connection prompt, receiving a connection instruction from the user, the connection instruction instructing the user device to not connect with the peripheral device, and
in response to the connection instruction instructing the user device to not connect with the peripheral device, preventing the user device from connecting with the peripheral device and adding the current peripheral identifier to the list of disregarded peripheral identifiers.

15. The method as in claim 1 wherein performing the peripheral access operation results in the user device being prevented from connecting with the peripheral device; and
wherein the method further comprises:
after the user device is prevented from connecting with the peripheral device, obtaining a second peripheral identifier from the operating system, the second peripheral identifier identifying a second peripheral device for recognition and possible connection with the user device.

16. The method as in claim 1 wherein the user device stores a list of disregarded peripheral identifiers identifying disregarded peripheral devices;
wherein the list of disregarded peripheral identifiers includes the current peripheral identifier to prevent the user device from connecting with the peripheral device; and
wherein the method further comprises:
receiving an edit instruction that instructs the user device to remove the current peripheral identifier from the list of disregarded peripheral identifiers, and
in response to the edit instruction, removing the current peripheral identifier from the list of disregarded peripheral identifiers.

17. A computer program product having a non-transitory computer readable medium that stores a set of instructions to manage connection between a user device and a peripheral device; the set of instructions, when carried out by circuitry of the user device, causing the circuitry of the user device to perform a method of:
obtaining a current peripheral identifier from an operating system running on the user device, the current peripheral identifier identifying the peripheral device;
based on the current peripheral identifier, performing a peripheral recognition operation that attempts to recognize the peripheral device; and
based on a result of the peripheral recognition operation, performing a peripheral access operation that determines whether the user device is allowed to connect with the peripheral device,
wherein obtaining the current peripheral identifier from the operating system includes:
calling a discovery routine of the operating system via an application programming interface (API) of the operating system, and
receiving a discovery result via the API of the operating system in response to calling the discovery routine, the discovery result indicating discovery of the peripheral device and including the current peripheral identifier;
wherein calling the discovery routine includes:
invoking, as the discovery routine, a Bluetooth peripheral scanning service of the operating system, the Bluetooth peripheral scanning service being configured to scan for Bluetooth available peripheral devices; and
wherein receiving the discovery result includes:
acquiring a discovery notification message from the Bluetooth peripheral scanning service, the discovery notification message (i) indicating discovery of a Bluetooth peripheral device as the peripheral device and (ii) containing a Bluetooth peripheral device instance that includes the current peripheral identifier.

18. A user device, comprising:
a wireless communications interface;
memory; and
control circuitry coupled to the wireless communications interface and the memory; the memory storing instructions that, when carried out by the control circuitry, cause the control circuitry to:
obtain a current peripheral identifier from an operating system running on the user device, the current peripheral identifier identifying a peripheral device,
based on the current peripheral identifier, perform a peripheral recognition operation that attempts to recognize the peripheral device, and
based on a result of the peripheral recognition operation, perform a peripheral access operation that determines whether the user device is allowed to connect with the peripheral device through the wireless communications interface;
wherein the control circuitry, when obtaining the current peripheral identifier from the operating system, is constructed and arranged to:
call a discovery routine of the operating system via an application programming interface (API) of the operating system, and
receive a discovery result via the API of the operating system in response to calling the discovery routine, the discovery result indicating discovery of the peripheral device and including the current peripheral identifier;
wherein the control circuitry, when calling the discovery routine, is constructed and arranged to:
invoke, as the discovery routine, a Bluetooth peripheral scanning service of the operating system, the Bluetooth peripheral scanning service being configured to scan for Bluetooth available peripheral devices; and
wherein the control circuitry, when receiving the discovery result, is constructed and arranged to:
acquire a discovery notification message from the Bluetooth peripheral scanning service, the discovery notification message (i) indicating discovery of a Bluetooth peripheral device as the peripheral device and (ii) containing a Bluetooth peripheral device instance that includes the current peripheral identifier.

19. A method of managing connection between a user device and a peripheral device, the method comprising:
obtaining a current peripheral identifier from an operating system running on the user device, the current peripheral identifier identifying the peripheral device;
based on the current peripheral identifier, performing a peripheral recognition operation that attempts to recognize the peripheral device; and
based on a result of the peripheral recognition operation, performing a peripheral access operation that determines whether the user device is allowed to connect with the peripheral device;
wherein the user device stores a list of disregarded peripheral identifiers identifying disregarded peripheral devices;
wherein the list of disregarded peripheral identifiers includes the current peripheral identifier to prevent the user device from connecting with the peripheral device; and
wherein the method further comprises:
receiving an edit instruction that instructs the user device to remove the current peripheral identifier from the list of disregarded peripheral identifiers, and
in response to the edit instruction, removing the current peripheral identifier from the list of disregarded peripheral identifiers.

20. The method as in claim 19 wherein obtaining the current peripheral identifier from the operating system includes:
calling a discovery routine of the operating system via an application programming interface (API) of the operating system, and
receiving a discovery result via the API of the operating system in response to calling the discovery routine, the discovery result indicating discovery of the peripheral device and including the current peripheral identifier;
wherein the peripheral device is a pointer apparatus configured to operate a remote desktop session provided by a virtual desktop client running on the user device;
wherein the discovery result further includes a current custom service identifier that is different from the current peripheral identifier;
wherein calling the discovery routine includes:
invoking the discovery routine from the virtual desktop client running on the user device; and
wherein receiving the discovery result includes:
comparing, by the virtual desktop client, the current custom service identifier with an expected custom service identifier to verify that the peripheral device is the pointer apparatus configured to operate the remote desktop session provided by the virtual desktop client running on the user device.

* * * * *